United States Patent
Dina et al.

(10) Patent No.: US 8,503,127 B2
(45) Date of Patent: Aug. 6, 2013

(54) METHOD AND CIRCUITRY FOR PROGRAMMABLY CONTROLLING DEGAUSS WRITE CURRENT DECAY IN HARD DISK DRIVES

(75) Inventors: Marius Vicentiu Dina, Inver Heights Grove, MN (US); Jeremy Robert Kuehlwein, Woodbury, MN (US)

(73) Assignee: Texas Instruments Incorporated, Dallas, TX (US)

( * ) Notice: Subject to any disclaimer, the term of this patent is extended or adjusted under 35 U.S.C. 154(b) by 229 days.

(21) Appl. No.: 12/939,006

(22) Filed: Nov. 3, 2010

(65) Prior Publication Data

US 2012/0105992 A1    May 3, 2012

(51) Int. Cl.
*G11B 5/03* (2006.01)
*G11B 5/09* (2006.01)

(52) U.S. Cl.
USPC ................................. 360/66; 360/46

(58) Field of Classification Search
None
See application file for complete search history.

(56) References Cited

U.S. PATENT DOCUMENTS

| | | | |
|---|---|---|---|
| 7,372,653 B2 | 5/2008 | Suzuki et al. | |
| 7,411,756 B2 | 8/2008 | Wilson et al. | |
| 7,460,324 B2 | 12/2008 | Ohinata et al. | |
| 7,812,754 B2 * | 10/2010 | Hsu et al. | 341/154 |
| 7,813,068 B2 | 10/2010 | Takeuchi | |
| 2006/0206555 A1 * | 9/2006 | Nomura et al. | 708/523 |

* cited by examiner

*Primary Examiner* — Regina N Holder
(74) *Attorney, Agent, or Firm* — Alan A. R. Cooper; Wade J. Brady, III; Frederick J. Telecky, Jr.

(57) ABSTRACT

A control circuit to provide a control current to control an amplitude of a write current in a magnetic media drive. The control circuit has an output circuit for providing the control current with an amplitude dependent on a bias voltage. A bias current path provides the bias voltage to the output circuit, and a current diverting circuit is connected to divert current from the bias current path. A programmable ramp voltage generator operates in response to a degauss enable signal, and a voltage-to-current converter receives the programmable ramp voltage to control the current diverting circuit to divert current from the bias current path at a rate determined by the programmable ramp voltage. The bias voltage and the write current decay according to the programmable ramp voltage. The write current decay can be made linear and independent of a beginning write current amplitude.

15 Claims, 7 Drawing Sheets

METHOD AND CIRCUITRY FOR PROGRAMMABLY CONTROLLING DEGAUSS WRITE CURRENT DECAY IN HARD DISK DRIVES

FIELD

The various circuit embodiments and methods described herein relate in general to improvements in mass data storage devices of the type that use a magnetic media onto which data is written, and, more specifically, to improvements in circuits and methods for degaussing a write head used in a mass data storage device of the type described, and the like.

BACKGROUND

Mass data storage devices include well-known hard disk drives that have one or more spinning disks or platters carrying a magnetic media onto which data is recorded for storage and subsequent retrieval. One or more write heads are provided that fly over the magnetic media to generate magnetic fields in response to write currents applied to the heads to change the magnetic domains of the magnetic media corresponding to the data being written. However, the write heads themselves contain materials that may become magnetized as the write currents are applied to them. This residual magnetism may degrade the performance of the read and write operations to be carried out in subsequent operations of the data storage device.

Thus, one of the requirements of hard disk drive design is the provision of a degauss feature to demagnetize or degauss the write head after a write process has been performed. A typical method that has been used is to turn on an oscillator that provides a signal that becomes the input to the write driver for a number of oscillator cycles. After the oscillator is turned on, the amplitude of the write current is caused to decay from an initial write current setting to very close to zero, after which the oscillator and write driver are turned off.

Another requirement of the degauss feature is that the final decay value of the write current should be close to zero, independent from the initial write current setting. This means that for different initial write currents, at the end of the degauss time the final write current needs to always be the same, close to zero.

In the past, one degaussing circuit that has been used has a write current control circuit that has a digital-to-analog converter (DAC) which has a number of MOS transistors connected in parallel that may be selectively enabled to carry the output write current. The magnitude of the write current is dependent on the number of DAC transistors that are enabled and the control voltage that is applied to the gates of the enabled transistors.

The control voltage on the gates of the enabled DAC transistors is established by an input bias circuit, which, in the normal write mode, has a current source that provides a current through an input MOS transistor. The voltage developed across the input MOS transistor directly controls the control voltage on the gates of the enabled DAC transistors, which, in turn, controls the magnitude of the write current. In the normal write mode, the gate of the input MOS transistor is charged to a normal operating voltage, which establishes the amplitude of the write current.

When a degauss enable signal occurs after a data write operation, the current source to the input MOS transistor is disconnected, and a resistor is connected between the gate of the input MOS transistor and ground to discharge the normal operating voltage on the gate. As the voltage on the gate discharges, the control voltage on the gates of the DAC transistors decreases, thereby decreasing the write current.

There are several problems with this method. The voltage on the input MOS transistor is process dependent. For example, weak and strong MOS devices will produce different control voltages. Different control voltages results in different times that it takes for the normal operating voltage on the gate of the input MOS transistor to discharge down to the threshold value of the DAC transistors, which is the point where the write current equals zero.

Additionally, depending on the number of DAC transistors that are enabled, the total capacitance at the gate of the input MOS transistor may greatly vary. This results in different time decay constants, depending on the number of enabled DAC MOS transistors.

Finally, the decay of the output current is uncontrollably nonlinear.

Thus, what is needed is a circuit and method that provides a degaussing current that is process independent, is independent of the number of enabled DAC transistors, can be controlled to follow virtually any decay pattern, and can be controlled to decay to essentially zero from any initial starting current value.

SUMMARY

According to a broad circuit embodiment, a control circuit is described that provides a control current to control an amplitude of a write current in a magnetic media drive. The control circuit has an output circuit for providing the control current with an amplitude dependent on a bias voltage. A current mirror having a reference current path and a bias current path in which current in the reference current path is mirrored provides the bias voltage to the output circuit, and a current diverting circuit is connected to divert current from the bias current path. A circuit is provided for generating a programmable ramp voltage in response to a degauss enable signal. The programmable ramp voltage is applied to a voltage-to-current converter which is connected to the current diverting circuit to divert current from the bias current path at a rate determined by the programmable ramp voltage. Thus, the bias voltage and the write current decay according to the programmable ramp voltage. In one embodiment, the write current decay is linear and is independent of a beginning write current amplitude.

According to another broad circuit embodiment, a data write circuit provides a write current to a write head in a magnetic media drive. The circuit includes a data write head, a write driver circuit, and a write current and degauss decay circuit. The write driver circuit provides a write current to the write head of amplitude controlled by the write current and degauss decay circuit. The write current and degauss decay circuit has an output circuit for providing a control current to the write driver to control an amplitude of the write current, the control current being of amplitude dependent on a bias voltage. A current mirror has a reference current path and a bias current path in which current in the reference current path is mirrored to provide the bias voltage to the output circuit, and a current diverting circuit is connected to divert current from the bias current path. A circuit is provided for generating a programmable ramp voltage in response to a degauss enable signal, and a voltage-to-current converter receives the programmable ramp voltage to control the current diverting circuit to divert current from the bias current path at a rate determined by the programmable ramp voltage. Thus, the bias voltage decays according to the programmable ramp voltage. A degauss oscillator delivers pulses to the write driver in response to the degauss enable signal so that the write current delivers the pulses to the write head in a decaying amplitude according to the programmable ramp voltage.

A broad embodiment of a method for controlling an amplitude of a write current to a write head in a magnetic media drive includes providing a control current of amplitude dependent on a bias voltage to control the amplitude of the write current, and providing a bias current path. The current in the bias current path controls the bias voltage. The bias current is diverted from the bias current path according to a programmable ramp voltage in a write head degauss mode, whereby the bias voltage and the write current decay according to the programmable ramp voltage.

BRIEF DESCRIPTION OF THE DRAWINGS

In the various figures of the drawing, like reference numbers are used to denote like or similar parts, functions, or signals.

DETAILED DESCRIPTION

Figure 1:
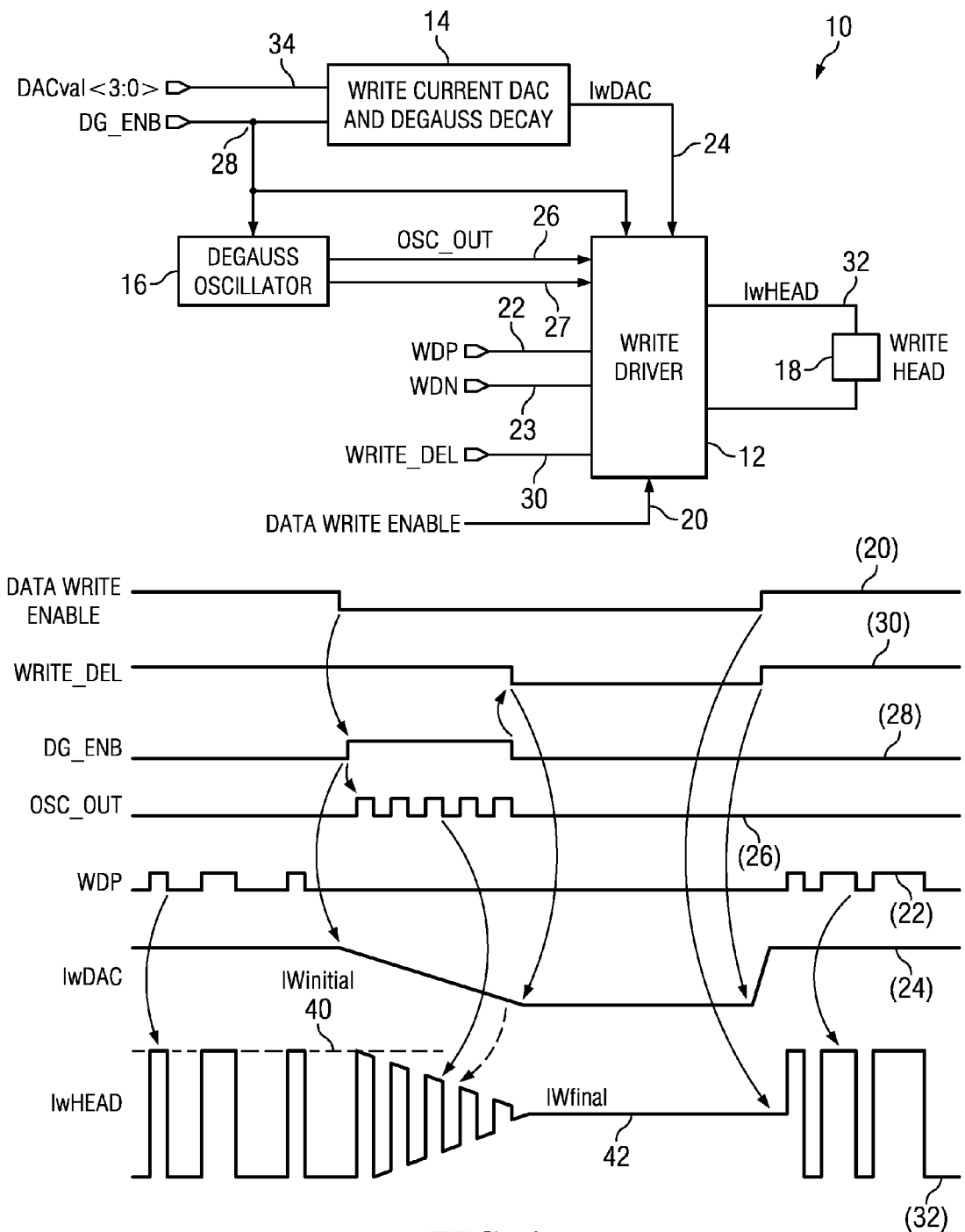
FIG. 1 is a block diagram of a circuit for providing degaussing current to a write head of a mass data storage device, together with various waveforms applied to, within, and delivered by the circuit.

With reference first to FIG. 1, a simplified block diagram of a write current circuit 10 for a magnetic media drive, such as a hard disk drive, or the like, is shown. Examples of the various waveforms on selected lines of the diagram are shown, with the signal examples being indicated by reference numerals corresponding to the line on which the signal appears, but enclosed in parentheses (( )). The write current circuit 10 has a write driver 12, a write current digital-to-analog converter (DAC) and degauss decay circuit 14, and a degauss oscillator 16 to provide write current IwHEAD 32 to a write head 18.

The write driver 12 receives inputs WDP 22 and WDN 23, which represent the data to be written to the head 18, and a data write enable signal 20. The data input signal, WDP, for example, is illustrated by waveform (22), and the data input signal, WPN, not shown, is its complement. The write driver 12 also receives the output IwDAC 24 from the write current DAC and degauss decay circuit 14, and an output, OSC_OUT 26-27, from the degauss oscillator 16. Finally, the write driver 12 receives a degauss enable signal, DG_ENB, on line 28 and a write delete signal, WRITE_DEL, on line 30.

The write current (DAC) and degauss decay circuit 14 receives the degauss enable signal 28 as well as a DAC configuration value DACval<3:0> on line 34, presenting, for example, four DAC configuration signals. The write current (DAC) and degauss decay circuit 14 produces a write current IwDAC signal (24) to the write driver 12, providing a control current that controls the amplitude of the write current IwHEAD delivered to the head 18 by the write driver 12.

The degauss oscillator 16 receives the degauss enable signal 28 and provides the OSC_OUT signal 26, 27 when the degauss enable signal 28 is high.

In operation, the write driver 12 serves to deliver write current pulses IwHEAD (32) to the write head 18, according to the write data WDP 22 and WPN 23, so long as the data write enable signal (20) remains high. The magnitude of the data write current IwHEAD (32) is controlled by the current IwDAC (24) from the write current (DAC) and degauss decay circuit 14. However, when the DATA WRITE enable signal (20) goes low, the inputs to the write driver 12 becomes the oscillator output signal OSC_OUT (26). At the same time, when the degauss enable signal (28) goes high, the current IwDAC (24) from the write current (DAC) and degauss decay circuit 14 decays, driving the write head current IwHEAD to decay from its initial value 40 to a final value IWfinal 42 near zero. As the write driver current IwHEAD (32) follows the oscillator output signal (26), however, the amplitude of each pulse decays following the slope of the decaying current IwDAC (24), until the write driver current IwHEAD (32) is almost zero, Iwfinal 42.

When the degauss enable signal EG_ENB (28) goes high after the degauss process is completed, the write delete signal WRITE_DEL (30) goes low, holding the write head current IwHEAD (32) at zero. When the write delete signal WRITE_DEL signal returns to high, the write driver 12 returns to normal operation in which the data input signals WDP 22 and WDN 23 again serve as its input signals.

Figure 2:
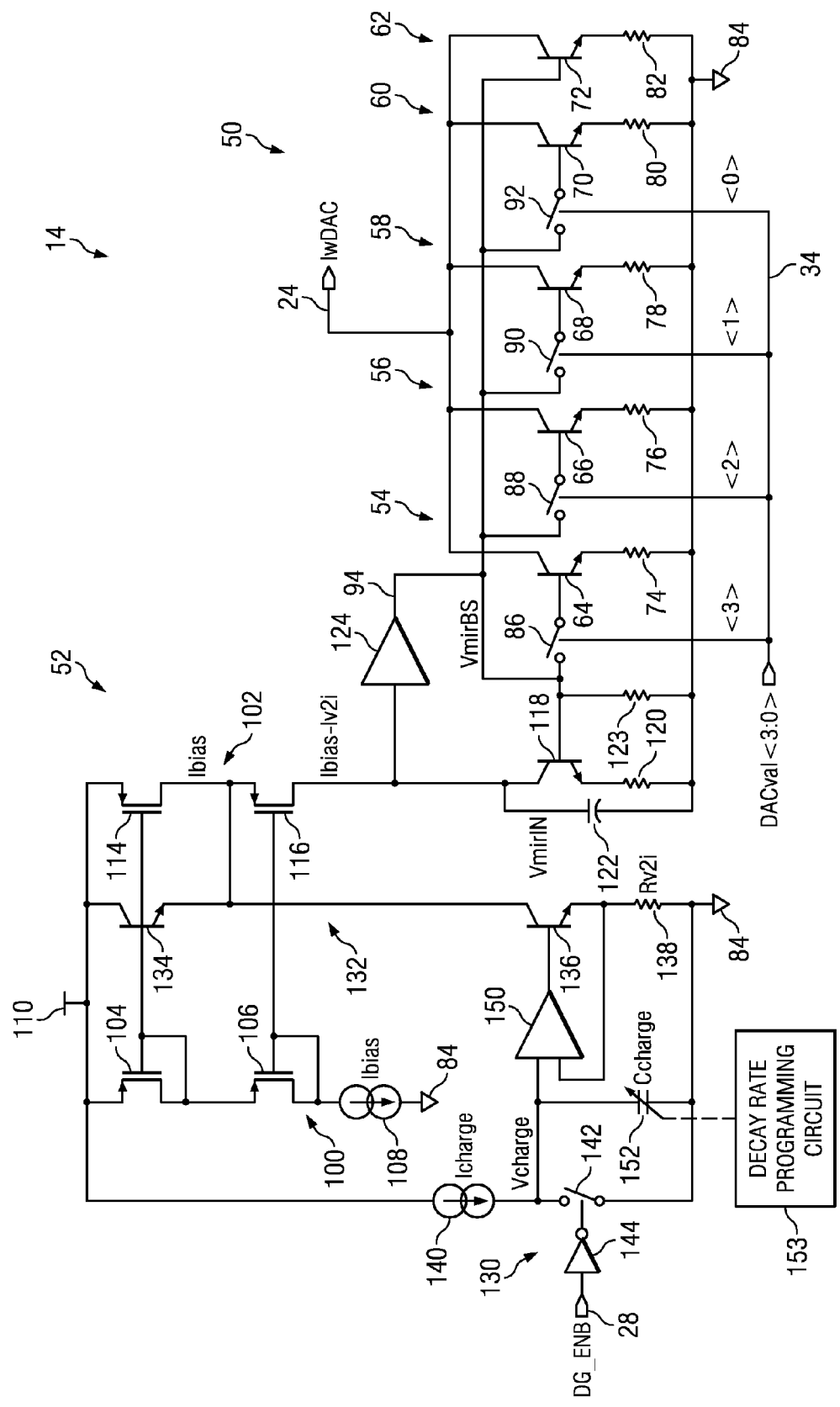
FIG. 2 is an electrical schematic diagram of a circuit for generating a programmable current to control the amplitude of the write current in a hard disk drive, including circuitry to controllably decrease the amplitude of the write current in a degauss mode of operation.

FIG. 2, to which reference is now additionally made, is a schematic diagram of the write current DAC and degauss decay circuit 14 circuit generating a current IwDAC for controlling the amplitude of the data write current (IwHEAD). The write current (DAC) and degauss decay circuit 14 may be used, for example in the circuit 10 of FIG. 1. The write current DAC and degauss decay circuit 14 includes an output circuit, in the embodiment illustrated provided by a DAC section 50, and a control section 52. The DAC section 50 has four programmable cells 54, 56, 58, and 60 and an unswitched cell 62. Although the cells 54, 56, 58, 60, and are implemented with npn bipolar transistors, which provide speed and matching capabilities in this example circuit, MOS or other device types may be equally advantageously employed.

Each cell 54, 56, 58, 60, and 62 has a respective npn bipolar transistor 64, 66, 68, 70, and 22 and resistor 74, 76, 78, 80, and 82 connected in series between the control current, IwDAC, line 24 and a reference potential, or ground 78. Selection switches 86, 88, 90, and 92 switchably connect the bases of the respective transistors 64, 66, 68, and 70 of cells 54, 56, 58, and 60 to a control voltage line 94, which is controlled by the control section 52. The selection switches 86, 88, 90, and 92 are switched by signals from the program signal, DACval<3:0>, on line 34. In the embodiment shown, although a single line 34 is illustrated, it will be understood that a plurality of lines are employed to individually close a respective selection switch 86, 88, 90 or 92 depending on the digital value of the signal DACval<3:0> 34.

In operation, the DAC section 50 provides an output control current on line 24 of amplitude dependent on the number of DAC cells that are selected by the DACval<3:0> signal and on the drive or bias voltage VmirBS which is developed by the control section 52 supplied to the bases of the transistors of the selected cells on line 94.

The control section 52 has a current mirror having a reference current path 100 and a bias current path 102. The reference current path 100 has two PMOS transistors 104 and 106 connected in series with a current source 108 between a supply voltage Vcc 110 and a reference potential, or ground 84. The gates and drains of the respective PMOS transistors 104 and 106 are connected.

The bias current path 102 has two PMOS transistors 114 and 116 connected in series with an npn bipolar transistor 118 and resistor 120 between the supply voltage Vcc 110 and a reference potential, or ground 84. The npn bipolar transistor 118 serves as the master transistor of the DAC section 50 to mirror the current of the bias current path to the bases of the npn transistor 72 and the selected npn transistors 64, 66, 68, and 70 of the DAC section 50. The gates of the PMOS 114 and 116 are connected respectively to the gates of PMOS transistors 104 and 106 to mirror the current of the reference current path 100 therethrough.

A capacitor 122 and mirror resistor 123 are connected from the collector of the npn transistor 118 to ground 84. The output from the control section 52 is also derived at the collector of the npn transistor 118 by a driver amplifier 124, which isolates the control section 52 from the DAC section 50 and provides the drive or bias voltage VmirBS on line 94 to the gates of the DAC npn transistors 64, 66, 68, 70, and 72 and to the npn transistor 118 in the bias current path 102. One advantage of using an operational amplifier 124, rather than an emitter or source follower device, is that an emitter follower may shut off if its input VmirIN goes low fast enough, which, in turn, may cause a nonlinear turn off characteristic for the IwDAC current characteristic for the IwDAC current output on line 24.

In addition, the control section 52 has a voltage-to-current converter circuit 130, which operates in response to a degauss enable signal on line 28 in a manner described below in greater detail. The voltage-to-current converter circuit 130 has a current diverting circuit 132 having an two npn transistors 134 and 136 connected in series with a resistor 138 between the voltage source Vcc 110 and ground 84. If desired, the resistor 138 can be made to be programmable to track process variations in components used to generate the Ibias current supplied by current source 108. This allows room for capacitor variations that are typically on the order of +/−10%, for example.

A current source 140 and a normally closed degauss enable switch 142 are also connected in series between the voltage source Vcc 110 and ground 84. In the embodiment illustrated, an inverter 144 applies the degauss enable signal on line 28 to operate the degauss enable switch 142. The current source 140 may alternatively be provided by a trimmed capacitor current of the type used, for example, for precision timers to improve the process independence of the current, Icharge, used to charge the programmable capacitor 152 connected between the non-inverting input of the operational amplifier 150 and ground 84. The non-inverting input of the operational amplifier 150 is also connected between the current source 140 and the degauss enable switch 142. The inverting input of the operational amplifier 150 is connected between the emitter of the npn transistor 126 and the resistor 138, thereby forming a voltage-to-current converter.

The npn transistor 136 serve as a current control element to controls the current flowing in the current diverting circuit 132, in accordance with the output from the operational amplifier 150. Thus, the output from the operational amplifier 150 is adjusted to produce a bias voltage to the selected DAC cells 54, 56, 58, 60, and 62 that results in a control current, IwDAC, on line 24 of desired amplitude in normal operation. This, of course, is the beginning amplitude of the degauss pulses at the beginning of a degauss cycle.

In operation, when the degauss enable signal, DG_ENB, is low, the current Ibias produced by current source 108 is mirrored in the PMOS mirror transistors 104, 106, 114 and 116 to the DAC section 50 on line 94. At this point the current Iv2i in the bias current path 102 equals zero and the output current, IwDAC, of the DAC section is equal to Ibias*(1+DACval)/16, where DACval is the decimal equivalent of DACval<3:0>.

In response to the degauss enable signal DG_ENB going high, the switch 142 opens and current Icharge from current source 140 starts charging the capacitor 152 linearly, to provide a programmable ramp voltage as given by the following equation: Vcharge=(Icharge/Ccharge)*t (t is time). The ramp voltage Vcharge is received by the operational amplifier 150, the npn transistor 136, and the resistor 138, and is converted to a time linear current, Iv2i. The current Iv2i is given by: Iv2i=Vcharge/Rv2i=(Icharge/[Ccharge*Rv2i])*t, which is a time linear current.

The time linear current Iv2i is then subtracted from the current flowing into PMOS device 114 (which is Ibias), with the net result of Ibias−Iv2i flowing through the master npn transistor 118 of the DAC section 50. The biasing of the DAC section 50 is done by the operational amplifier 124, which has sufficient bandwidth to follow both a negative and positive change of voltage from its input VmirIN to its output VmirBS, thereby providing a linear current decay at the IwDAC current output on line 24.

To programmably change the charge rate, and therefore the decay rate of the degaussing current, the capacitance of the capacitor 152 may be changed by a programming circuit 153. The programming circuit 153 may, for example, switch capacitors into a parallel connection with the capacitor 152. It should be appreciated that although a linear current decay circuit has been described, by selection of the components of the voltage-to-current converter circuit 130, any current decay pattern can be achieved.

Finally, npn transistor 134 is used as a clamp device so that if Iv2i exceeds Ibias, the collector of npn transistor 136 will only drop to $Vcc-Vgs_{transistor\ 104}-Vbe_{npn\ transistor\ 134}$, preventing npn transistor 136 from saturating. Iv2i may be set to be greater than Ibias, so that it will be guaranteed that Ibias−Iv2i equals zero.

Figure 3:
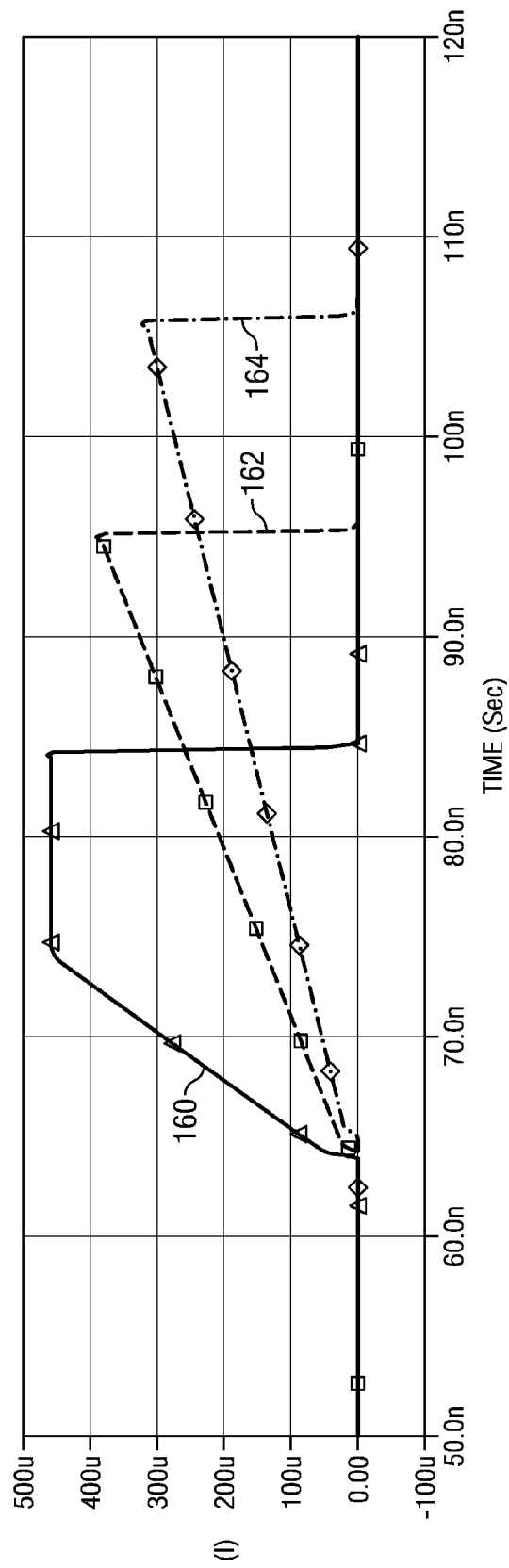
FIG. 3 is a graph of current vs. time, showing the current in a current diverting path for three different ramp voltage slopes in the circuit of FIG. 2.

FIG. 3, to which reference is now additionally made, is a graph of current vs. time, showing three values of Iv2i, 160, 162, and 164, resulting from three different values of Icharge in the write current (DAC) and degauss decay circuit 14 of FIG. 2.

Figure 4:
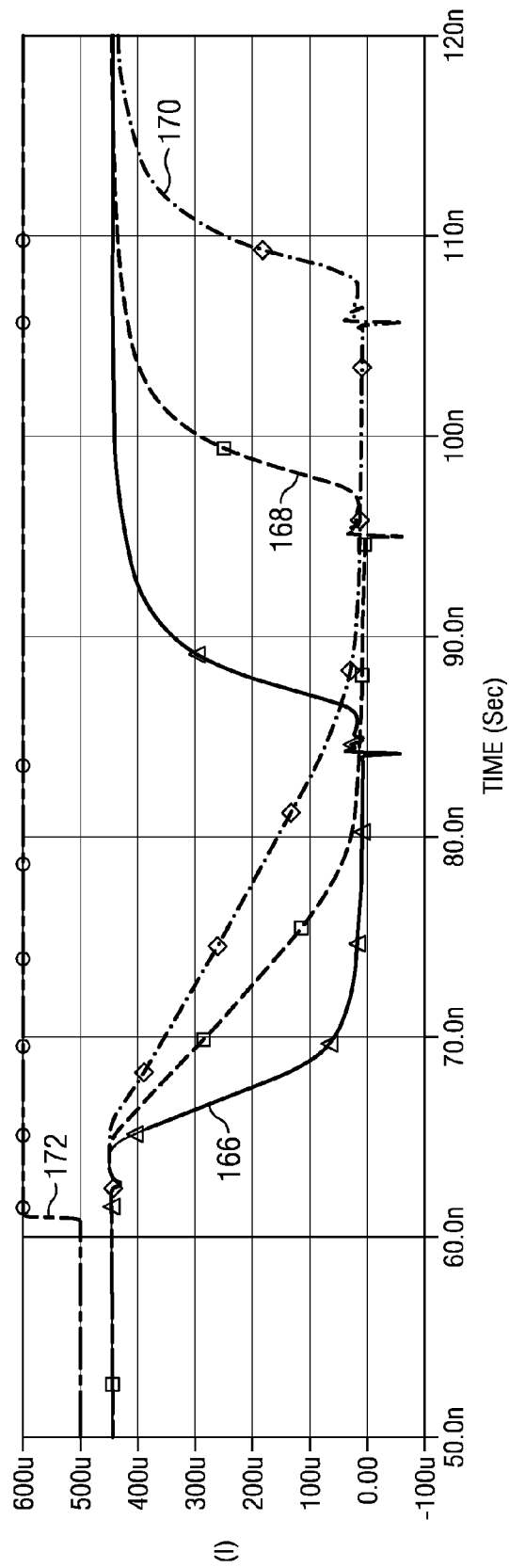
FIG. 4 is a graph of current vs. time, showing the result of the linear decayed control current achieved with the circuit of FIG. 2.

FIG. 4, to which reference is now additionally made, is a graph of current vs. time, showing the linear decayed current IwDAC results 166, 168 and 170, achieved with the circuit of FIG. 2 for the same Icharge current values of FIG. 3. The curves 166, 168, and 170 are shown in time relationship to the (inverted) DATA WRITE enable signal 172.

Figure 5:
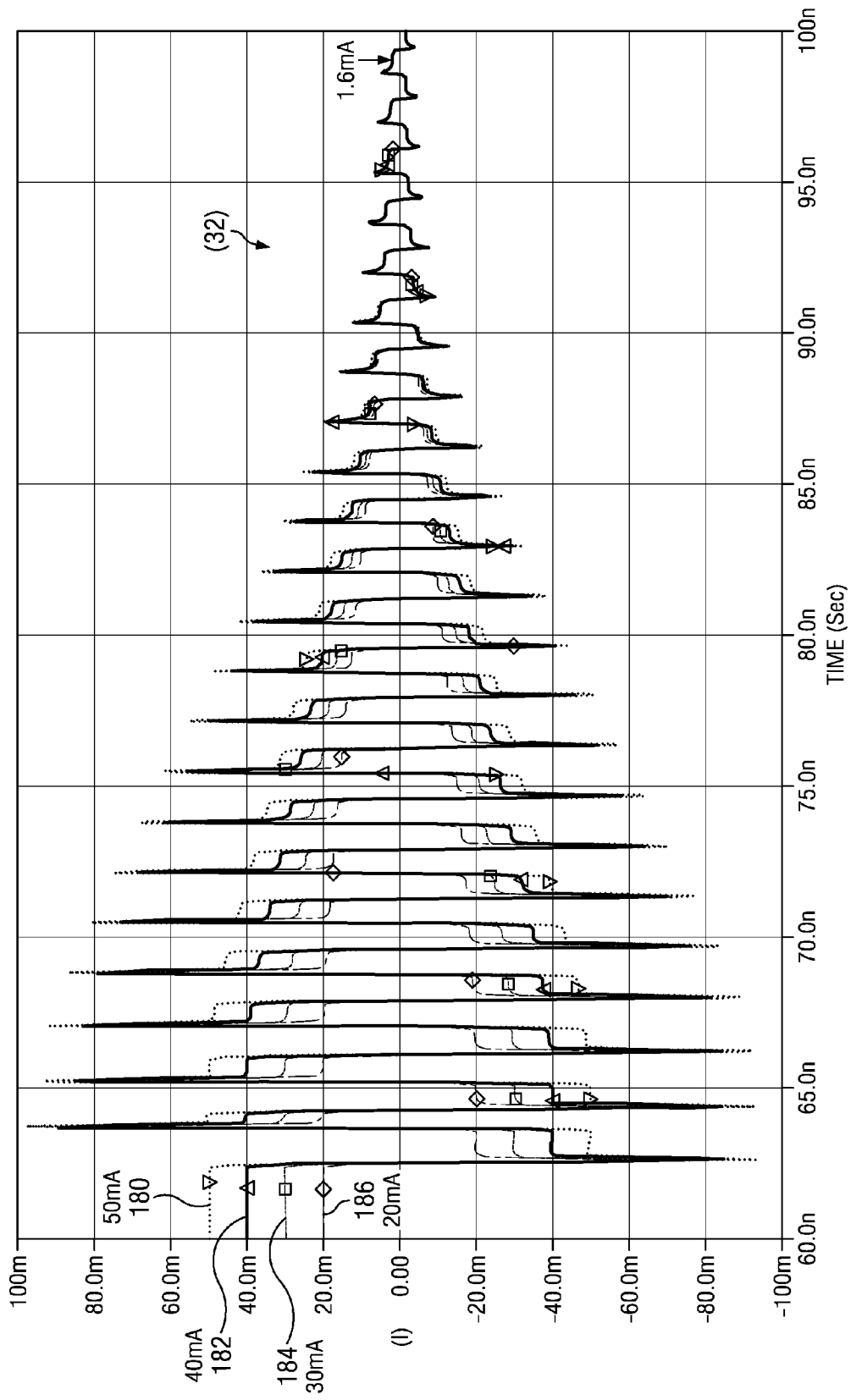
FIG. 5 is a graph of write driver output current vs. time, showing the resulting decay of the write driver output current for various initial write current values.

FIG. 5, to which reference is now additionally made, is a graph of write driver output current vs. time, showing the resulting decay waveforms 180, 182, 184, and 186 of the write driver output current for initial write current values, respectively of 50 mA, 40 mA, 30 mA, and 20 mA. It can be seen that the write driver output current (32) in each case decays to the same value, near zero, at substantially the same time, regardless of the initial write driver current value. It can also be seen that the decay is substantially linear over time for each different beginning write driver output current value.

Figure 6:
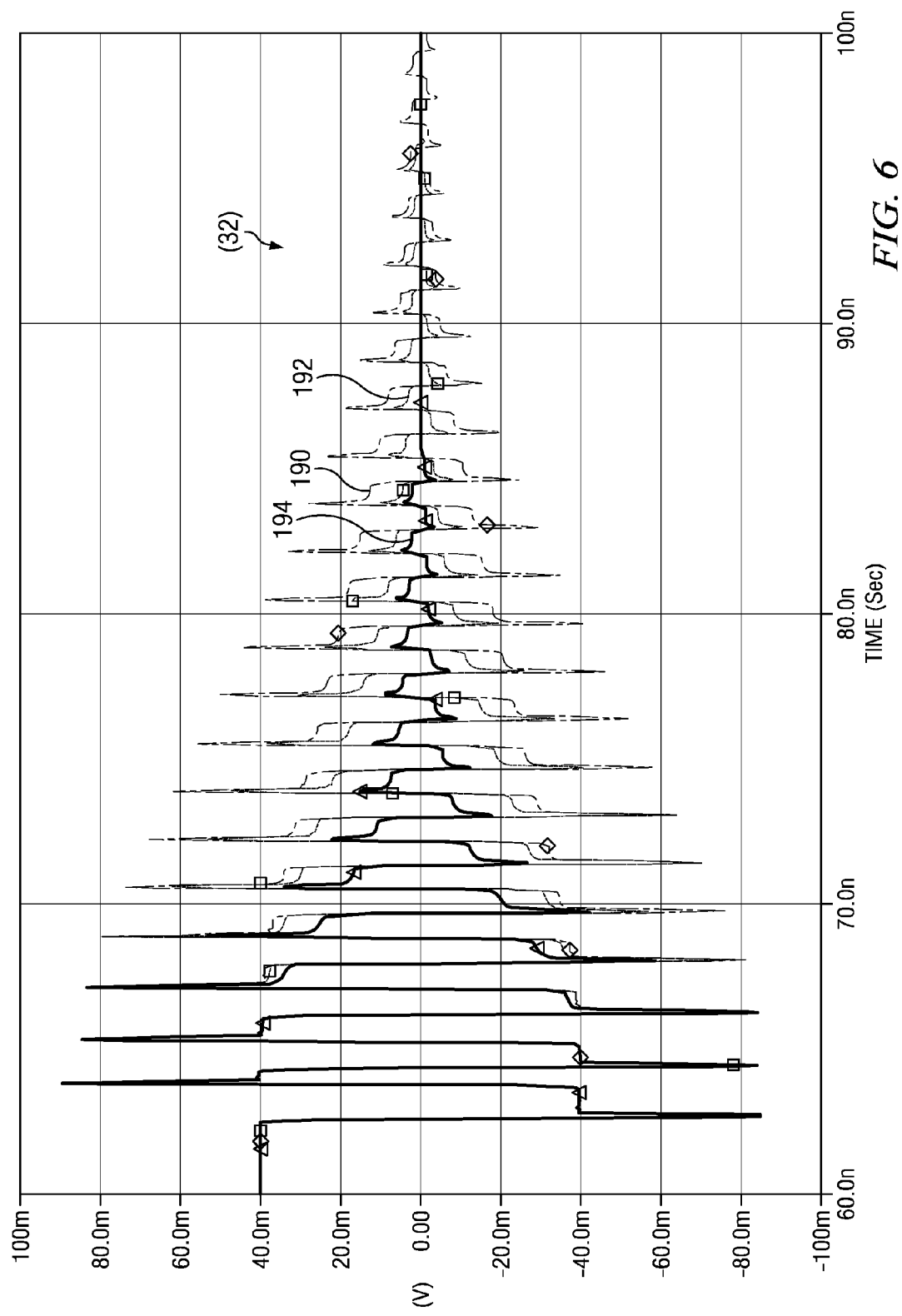
FIG. 6 is a graph of write driver output current vs. time, showing different program values of the decay rate of the circuit of FIG. 2.

FIG. 6, to which reference is now additionally made, is a graph of write driver output current vs. time, showing different the write driver output current waveforms 190, 192, and 193 resulting from three different program values of the decay rate of the circuit of FIG. 2. It can be seen that the time that the write driver output current reaches a substantially zero value is controlled, in this embodiment, from a time of about 80 nsec to about 100 nsec.

Figure 7:
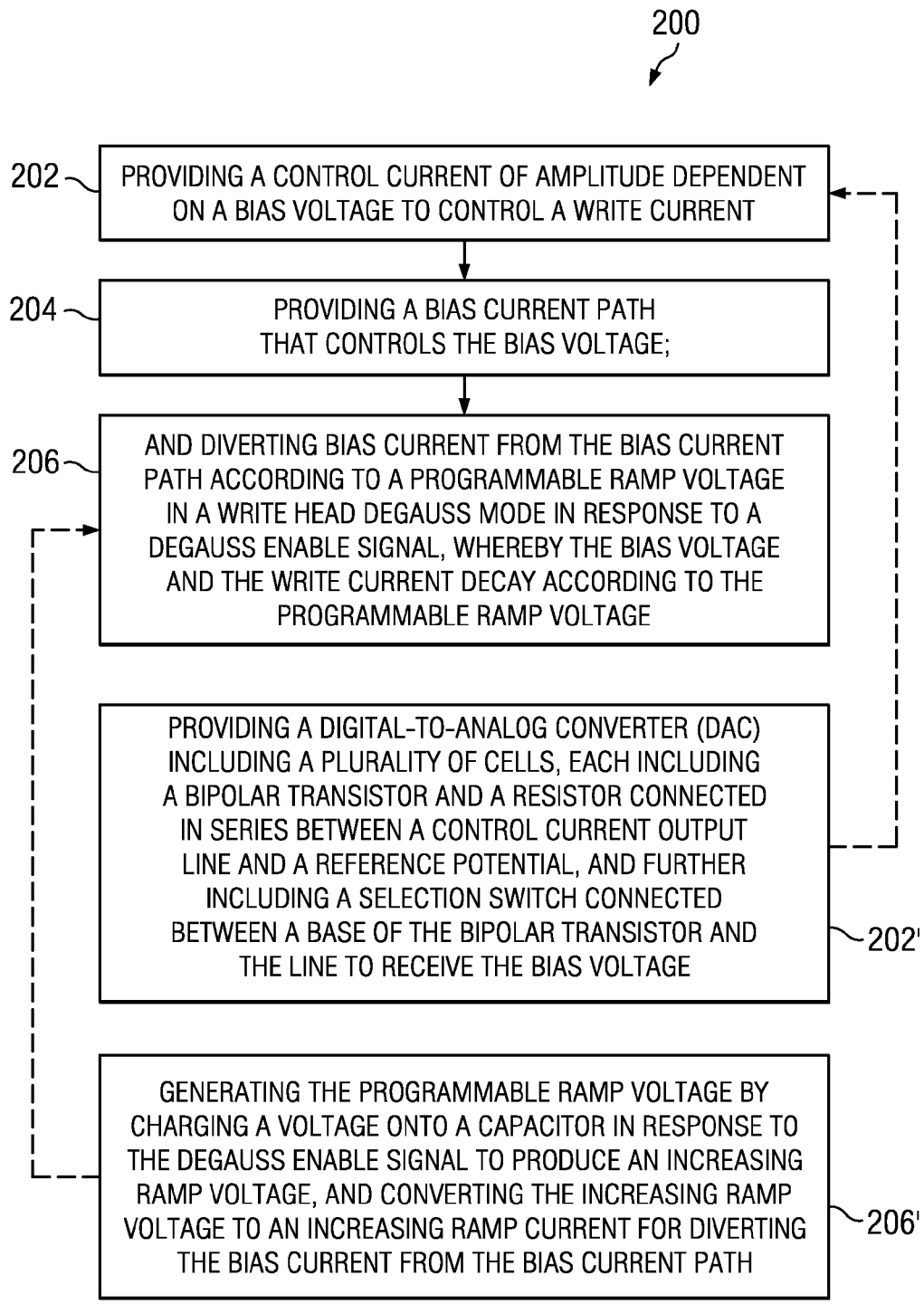
FIG. 7 shows a flow diagram illustrating one embodiment of a method for controlling an amplitude of a write current to a write head in a magnetic media drive.

FIG. 7, to which reference is now additionally made shows a flow diagram 200 illustrating one embodiment of a method for controlling an amplitude of a write current to a write head in a magnetic media drive. The method includes providing a control current of amplitude dependent on a bias voltage to control the write current, shown in box 202. A bias current path is provided that controls the bias voltage, box 204. And the bias current is diverted from the bias current path according to a programmable ramp voltage in a write head degauss mode in response to a degauss enable signal, whereby the bias voltage and the write current decay, which may be linear or other waveform, according to the programmable ramp voltage, box 206.

In one embodiment, the method for providing a control current comprises providing a digital-to-analog converter (DAC) including a plurality of cells, each cell including a bipolar transistor and a resistor connected in series between a control current output line and a reference potential, and further including a selection switch connected between a base of the bipolar transistor and the line to receive the bias voltage, shown in box 202'.

In one embodiment, the method for generating the programmable ramp voltage comprises charging a voltage onto a capacitor in response to the degauss enable signal to produce an increasing ramp voltage, and converting the increasing ramp voltage to an increasing ramp current for diverting the bias current from the bias current path, shown in box 206'.

It will be appreciated that many of the circuit elements disclosed herein are of particular types, for example, bipolar junction transistors of certain conductivities (for example, npn or pnp). It will be understood that other transistor types and other transistor conductivities may be equally advantageously employed with appropriate circuit or supply voltage changes. For example, the DAC section 50 of FIG. 2 has been shown as being implemented with npn bipolar transistors, but pnp devices may be equally advantageously employed; moreover, MOS devices or other FET type devices may also be equally advantageously employed.

Electrical connections, couplings, and connections have been described with respect to various devices or elements. The connections and couplings may be direct or indirect. A connection between a first and second electrical device may be a direct electrical connection or may be an indirect electrical connection. An indirect electrical connection may include interposed elements that may process the signals from the first electrical device to the second electrical device.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

The invention claimed is:

1. A circuit for providing a control current to control a write current amplitude in a magnetic media drive, comprising:

an output circuit for providing said control current of amplitude dependent on a bias voltage;

a bias current path to provide said bias voltage to said output circuit;

a current diverting circuit connected to divert current from said bias current path;

a circuit for providing a programmable ramp voltage in response to a degauss enable signal;

and a voltage-to-current converter receiving said programmable ramp voltage, and being connected to said current diverting circuit to divert current from said bias current path at a rate determined by said programmable ramp voltage, whereby said bias voltage and said write current decay according to said programmable ramp voltage, wherein said circuit for providing a programmable ramp voltage in response to a degauss enable signal comprises a current source, a capacitor in series with said current source, and a switch in parallel with said capacitor operated by said degauss enable signal to open to allow said current source to charge said capacitor to produce said ramp voltage thereacross, wherein said write current decay is substantially a substantially linearly decaying pulse, wherein each pulse is also itself linearly decaying, and wherein said write current is also substantially independent of a beginning write current amplitude.

2. The circuit of claim 1 further comprising a current mirror including a reference current path and said bias current path in which current in said reference current path is mirrored to said bias current path to generate said bias voltage to said output circuit.

3. The circuit of claim 1 wherein said output circuit is a digital-to-analog converter (DAC).

4. The circuit of claim 3 wherein said DAC comprises a plurality of cells, each cell including a bipolar transistor and a resistor connected in series between a control current output line and a reference potential, and further including a selection switch connected between a base of said bipolar transistor and said line to receive said bias voltage.

5. The circuit of claim 1 further comprising a current control element in said current diverting circuit and wherein said voltage-to-current converter is connected between said capacitor and said current control element.

6. The circuit of claim 1, wherein the pulse is an alternating pulse of two substantially linearly decreasing envelopes of pulses.

7. A circuit for providing a write current to a data write head in a magnetic media drive, comprising:

a write driver circuit providing a write current to said write head;

a write current and degauss decay circuit, comprising:

an output circuit for providing a control current to said write driver to control an amplitude of said write current, said control current being of amplitude dependent on a bias voltage;

a bias current path to provide said bias voltage to said output circuit;

a current diverting circuit connected to divert current from said bias current path;

a circuit for providing a programmable ramp voltage in response to a degauss enable signal;

and a voltage-to-current converter receiving said programmable ramp voltage, and being connected to said current diverting circuit to divert current from said bias current path at a rate determined by said programmable ramp voltage, whereby said bias voltage decays according to said programmable ramp voltage;

and a degauss oscillator to deliver pulses to said write driver in response to said degauss enable signal, wherein said write current delivers said pulses to said write head in a decaying amplitude according to said programmable ramp voltage, wherein said circuit for providing a programmable ramp voltage in response to a degauss enable signal comprises a current source, a capacitor in series with said current source, and a switch in parallel with said capacitor operated by said degauss enable signal to open to allow said current source to charge said capacitor to produce said ramp voltage thereacross, wherein said write current decay is substantially a substantially linearly decaying pulse, wherein each pulse is also itself linearly decaying, and wherein said write current is also substantially independent of a beginning write current amplitude.

8. The circuit of claim 7 further comprising a current mirror including a reference current path and said bias current path in which current in said reference current path is mirrored to said bias current path to generate said bias voltage to said output circuit.

9. The circuit of claim 7 wherein said output circuit is a digital-to-analog converter (DAC).

10. The circuit of claim 9 wherein said DAC comprises a plurality of cells, each cell including a bipolar transistor and a resistor connected in series between a control current output line and a reference potential, and further including a selection switch connected between a base of said bipolar transistor and said line to receive said bias voltage.

11. The circuit of claim 7 further comprising a current control element in said current diverting circuit and wherein said voltage-to-current converter is connected between said capacitor and said current control element.

12. The circuit of claim 7, wherein the pulse is an alternating pulse of two substantially linearly decreasing envelopes of pulses.

13. A method for controlling an amplitude of a write current to a write head in a magnetic media drive, comprising:

providing a control current of amplitude dependent on a bias voltage to control said write current;

providing a bias current path that controls said bias voltage;

and diverting bias current from said bias current path according to a programmable ramp voltage in a write head degauss mode, whereby said bias voltage and said write current decay according to said programmable ramp voltage, generating said programmable ramp voltage in response to a degauss enable signal, wherein said generating said programmable ramp voltage comprises charging a voltage onto a capacitor in response to said degauss enable signal to produce an increasing ramp voltage, and converting said increasing ramp voltage to an increasing ramp current for diverting said bias current from said bias current path, wherein said write current decay is substantially linear, wherein said write current decay is substantially a substantially linearly decaying pulse, wherein each pulse is also itself linearly decaying, and wherein said write current is also substantially independent of a beginning write current amplitude.

14. The method of claim 13 wherein said providing a control current comprises providing a digital-to-analog converter (DAC) including a plurality of cells, each cell including a bipolar transistor and a resistor connected in series between a control current output line and a reference potential, and further including a selection switch connected between a base of said bipolar transistor and said line to receive said bias voltage.

15. The method of claim 13, wherein the pulse 21, (is an alternating pulse of two substantially linearly decreasing envelopes of pulses.

* * * * *